(12) United States Patent
Hecht

(10) Patent No.: US 9,409,241 B2
(45) Date of Patent: Aug. 9, 2016

(54) CUTTING TOOL AND REPLACEABLE CUTTING HEAD HAVING SPIRAL DRIVEN SURFACES THEREFOR

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 841 days.

(21) Appl. No.: 13/714,024

(22) Filed: Dec. 13, 2012

(65) Prior Publication Data

US 2014/0169892 A1 Jun. 19, 2014

(51) Int. Cl.

| B23B 51/02 | (2006.01) |
|---|---|
| B23C 5/22 | (2006.01) |
| B23C 5/00 | (2006.01) |
| B23B 31/113 | (2006.01) |
| B23C 5/10 | (2006.01) |
| B23B 31/00 | (2006.01) |
| B23B 31/10 | (2006.01) |

(52) U.S. Cl.
CPC ............... *B23C 5/22* (2013.01); *B23B 31/005* (2013.01); *B23B 31/113* (2013.01); *B23C 5/006* (2013.01); *B23C 5/10* (2013.01); *B23C 5/1009* (2013.01); *B23B 2231/0204* (2013.01); *B23C 2210/02* (2013.01); *B23C 2210/03* (2013.01); *B23C 2240/04* (2013.01); *Y10T 407/1924* (2015.01); *Y10T 407/22* (2015.01); *Y10T 407/23* (2015.01)

(58) Field of Classification Search
CPC .. B23B 51/02; B23B 2251/02; B23B 31/113; B23B 2240/04
See application file for complete search history.

(56) References Cited

U.S. PATENT DOCUMENTS

| 6,276,879 | B1 * | 8/2001 | Hecht | .................. B23B 31/008 279/93 |
|---|---|---|---|---|
| 6,494,648 | B2 * | 12/2002 | Harpaz | ................... B23B 31/11 407/30 |
| 6,506,003 | B1 * | 1/2003 | Erickson | ................. B23B 51/02 408/226 |
| 6,582,164 | B1 * | 6/2003 | McCormick | .......... B23B 31/113 408/144 |
| 6,896,450 | B2 * | 5/2005 | Rothenstein | ............. B23C 5/10 279/8 |

(Continued)

FOREIGN PATENT DOCUMENTS

WO 2011/021275 2/2011

OTHER PUBLICATIONS

International Search Report dated Mar. 5, 2014 issued in PCT counterpart application (no. PCT/IL2013/050983).

*Primary Examiner* — Will Fridie, Jr.
(74) *Attorney, Agent, or Firm* — Womble Carlyle

(57) ABSTRACT

A replaceable cutting head includes a forward cutting portion and a rearward mounting portion. The mounting portion includes a male coupling member that protrudes rearwardly from a base surface. The male coupling member includes three circumferentially spaced apart head fixation members, where each head fixation member has a head peripheral surface that spirals inwardly in a direction against the direction of rotation and diverges. A tool holder includes a female coupling member extends rearwardly from a holder forward surface. The female coupling member includes three circumferentially spaced apart holder fixation members, where each holder fixation member has a holder peripheral surface that diverges rearwardly. When a cutting tool, which includes said cutting head and tool holder, is in a locked position, the male coupling member of the replaceable cutting head is removably retained within the female coupling member of the tool holder by means of a self-lock mechanism.

29 Claims, 8 Drawing Sheets

(56) References Cited

U.S. PATENT DOCUMENTS

| | | | |
|---|---|---|---|
| 7,309,196 B2 * | 12/2007 | Ruy Frota de Souza | B23B 51/00 408/227 |
| 7,407,350 B2 * | 8/2008 | Hecht | B23B 51/02 407/34 |
| 8,021,088 B2 * | 9/2011 | Hecht | B23B 51/02 408/1 R |
| 8,678,723 B2 * | 3/2014 | Osawa | B23B 51/02 279/93 |
| 2004/0208716 A1 | 10/2004 | Krenzer | |
| 2006/0127194 A1 | 6/2006 | Schafer | |
| 2011/0194907 A1 | 8/2011 | Guy | |
| 2012/0099937 A1 | 4/2012 | Osawa et al. | |
| 2012/0155978 A1 | 6/2012 | Osawa et al. | |
| 2012/0315101 A1 | 12/2012 | Osawa et al. | |

* cited by examiner

CUTTING TOOL AND REPLACEABLE CUTTING HEAD HAVING SPIRAL DRIVEN SURFACES THEREFOR

FIELD OF THE INVENTION

The subject matter of the present application relates to cutting tools of the type in which a cutting head, having a male coupling member, is removably retained in a female coupling member, of a tool holder, by means of a self-locking mechanism.

BACKGROUND OF THE INVENTION

Cutting tools can be provided with a coupling mechanism for securely retaining a replaceable cutting head within a tool holder.

The replaceable cutting head can include a male coupling member and the tool holder can include a female coupling member.

In some such cutting tools, the male coupling member is an external thread and the female coupling member is an internal thread. An example of such a cutting tool is disclosed in, for example, U.S. Pat. No. 6,494,648.

In other such cutting tools the cutting tool can include matching radially extending surfaces on the replaceable cutting head and the tool holder for applying a torque force from the tool holder to the replaceable cutting head. Examples of such cutting tools are disclosed in U.S. Pat. No. 7,407,350, WO 2011/021275 and US 2012/0155978.

In still other such cutting tools the cutting tool can be devoid of said matching radially extending surfaces on the replaceable cutting head and the tool holder. An Example of such a cutting tool is disclosed in, for example, U.S. Pat. No. 6,276,879.

It is an object of the subject matter of the present application to provide a cutting tool having an improved means of coupling a replaceable cutting head in a tool holder.

It is a further object of the subject matter of the present application to provide a cutting tool having coupling mechanism between a replaceable cutting head and a tool holder with an improved positioning of the replaceable cutting head with respect to the tool holder when in a locked position.

SUMMARY OF THE INVENTION

In accordance with a first aspect of the subject matter of the present application there is provided a replaceable cutting head, for rotary cutting operations, having a head longitudinal axis around which the replaceable cutting head rotates in a direction of rotation, the head longitudinal axis extending in a forward to rearward direction, comprising:
a forward portion forming a cutting portion and a rearward portion forming a mounting portion;
the cutting portion comprising:
a plurality of cutting members extending radially with respect to the head longitudinal axis; and
the mounting portion comprising a male coupling member protruding rearwardly from a base surface, the base surface extending transversely with respect to the head longitudinal axis, and defining a boundary between the cutting portion and the mounting portion, the male coupling member comprising:
three circumferentially spaced apart head fixation members, each head fixation member comprising a head peripheral surface spiraling inwardly in a direction against the direction of rotation and diverging rearwardly with respect to the head longitudinal axis.

In accordance with a further aspect of the subject matter of the present application, there is also provided a cutting tool comprising:
a replaceable cutting head; and
a tool holder, having a holder longitudinal axis extending in the forward to rearward direction, comprising a female coupling member extending rearwardly from a holder forward surface, the holder forward surface extending transversely with respect to the holder longitudinal axis, the female coupling member comprising:
three circumferentially spaced apart holder fixation members, each holder fixation member comprising a recessed holder peripheral surface diverging rearwardly with respect to the holder longitudinal axis; and
a holder rear surface extending transversely with respect to the holder longitudinal axis and intersecting each holder fixation member; wherein
the male coupling member further comprises a rear surface, the rear surface intersecting the rearmost portion of each head fixation member; and
the replaceable cutting head is rotatable between a released position and a locked position, wherein in the locked position:
the male coupling member is removably retained in the female coupling member;
each of the head peripheral surfaces abuts a corresponding holder peripheral surface;
the base surface abuts the holder forward surface; and
the rear surface is spaced apart from the holder rear surface.

In accordance with a yet further aspect of the subject matter of the present application, there is also provided a tool holder having a longitudinal axis extending in a forward to rearward direction and a direction of rotation about the longitudinal axis, the tool holder comprising:
a female coupling member extending rearwardly from a holder forward surface, the holder forward surface extending transversely with respect to the holder longitudinal axis, the female coupling member comprising:
three circumferentially spaced apart holder fixation members, each holder fixation member comprising a recessed holder peripheral surface diverging rearwardly with respect to the holder longitudinal axis, wherein:
each holder peripheral surface spirals inwardly in a direction against the direction of rotation; and
each holder peripheral surface is formed as an undercut of a corresponding holder fixation member and hidden from view in a front view of the tool holder along the longitudinal axis; and
a holder rear surface extending transversely with respect to the holder longitudinal axis and intersecting each holder fixation member.

It is understood that the above-said is a summary, and that features described hereinafter may be applicable in any combination to the subject matter of the present application, for example, any of the following features may be applicable to the replaceable cutting head or the cutting tool:
A. A first angle α can be formed between the head longitudinal axis and a line tangential to any point on each head peripheral surface, wherein the first angle is in the range of $35° \leq \alpha \leq 55°$.
B. The first angle can be a 45° angle.
C. In each cross section of the male coupling member taken in a plane through the head peripheral surface and perpendicular to the head longitudinal axis, each head peripheral surface can lie on a spiral, having a spiral center, each head peripheral surface can form a spiral portion.

D. The two end points of each spiral portion can subtend a peripheral surface angle β relative to the spiral center, wherein the peripheral surface angle β can be in the range of 30°≤β≤60°.
E. Each spiral center can be coincident with the head longitudinal axis.
F. Each spiral can be an Archimedean spiral.
G. The pitch angle of each spiral portion can be less than 30°.
H. The head peripheral surfaces can serve as spiral driven surfaces applying torque transmission to the replaceable cutting head. The cutting portion can be devoid of a surface facing against the direction of rotation that can serve as a driven surface for applying torque transmission to the replaceable cutting head.
I. The head peripheral surfaces can serve as spiral driven surfaces applying torque transmission to the replaceable cutting head. The mounting portion can be devoid of a surface facing against the direction of rotation that can serve as a driven surface applying torque transmission to the replaceable cutting head.
J. The male coupling member can be devoid of a resilience slit.
K. The base surface can be perpendicular to the head longitudinal axis.
L. In an end view perpendicular to the head longitudinal axis, an imaginary cutting portion circle circumscribes the cutting portion has a maximum cutting portion diameter. The maximum cutting portion diameter can be greater than or equal to 25 mm.
M. An imaginary base surface circle circumscribing a largest dimension of the base surface, taken perpendicular to the head longitudinal axis, has a maximum base surface diameter. An imaginary male coupling member circle circumscribing a largest dimension of the male coupling member, taken perpendicular to the head longitudinal axis, has a maximum male coupling member diameter and the maximum base surface diameter can be at least one and a half times as large as the maximum male coupling member diameter.
N. Measured in the forward direction along the head longitudinal axis from the base surface, the cutting portion has a maximum cutting portion length. Measured in the rearward direction along the head longitudinal axis from the base surface, the mounting portion has a maximum mounting portion length. The maximum cutting portion length can be at least two and a half times greater than the maximum mounting portion length.
O. Measured in the rearward direction along the head longitudinal axis from the base surface, the mounting portion has a maximum mounting portion length. An imaginary base surface circle circumscribing a largest dimension of the base surface, taken perpendicular to the head longitudinal axis, has a maximum base surface diameter. The maximum base surface diameter can be at least three times greater than the maximum mounting portion length.
P. The male coupling member can exhibit 3-fold rotational symmetry about the head longitudinal axis.
Q. The replaceable cutting head comprise a unitary integral one-piece construction.
R. Each head peripheral surface can lie on a portion of the curved surface of an associated imaginary irregular cone. The cone can have a spiral-shaped base surface.
S. The male coupling member can further comprise a rear surface. The rear surface can intersect the rearmost portion of each head fixation member.
T. The rear surface can be perpendicular with respect to the head longitudinal axis.
U. Each head fixation member can further include a chamfered surface, each chamfered surface can extend between its respective head peripheral surface and the rear surface and can converge rearwardly with respect to the head longitudinal axis.
V. Each head fixation member can further include a concave surface, extending between the base surface and each head peripheral surface.
W. The tool holder can further comprise a holder shank surface that can extend rearwardly from the holder forward surface. The female coupling member can open out to the holder shank surface at three circumferentially spaced apart holder flute surfaces. The holder forward surface comprises three spaced apart portions.
X. Each holder peripheral surface can spiral inwardly in a direction against the direction of rotation.
Y. The head longitudinal axis can be coaxial with the holder longitudinal axis.
Z. The peripheral portion of the holder forward surface can include a raised surface.

BRIEF DESCRIPTION OF THE FIGURES

For a better understanding of the present application and to show how the same may be carried out in practice, reference will now be made to the accompanying drawings, in which.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 1:
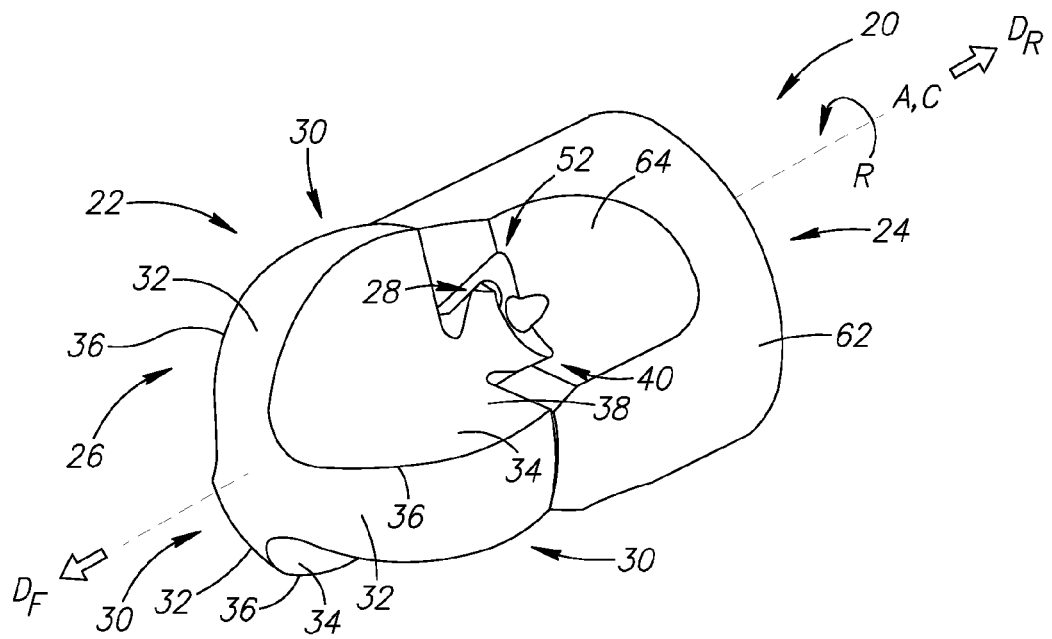
FIG. 1 is a front perspective view of a cutting tool.
Figure 2:
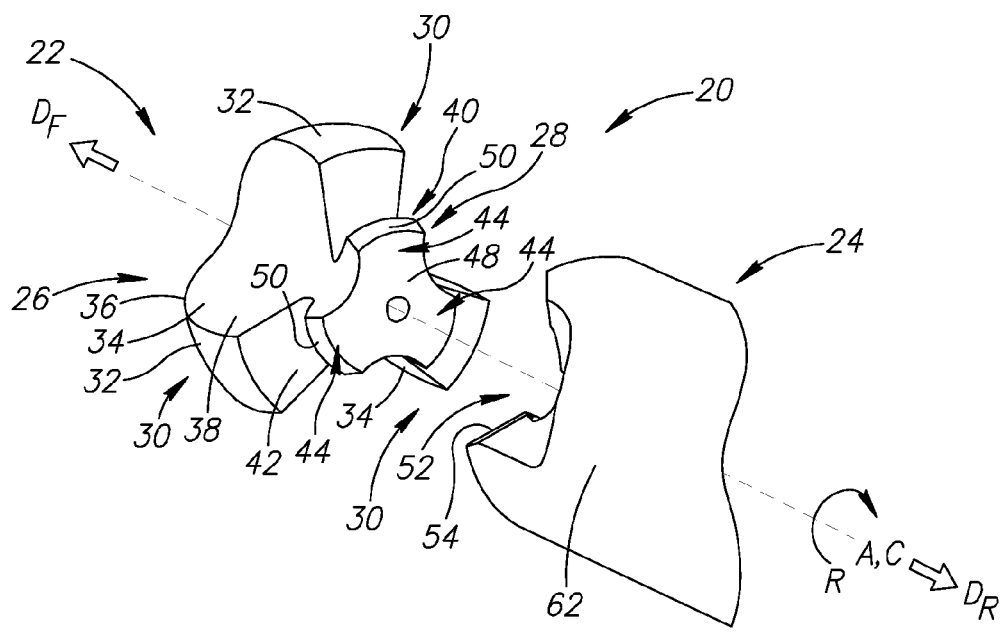
FIG. 2 is an exploded rear perspective view of the cutting tool shown in FIG. 1.

Attention is first drawn to FIGS. 1 and 2 showing a cutting tool 20 of the type used for milling operations, in particular end milling, in accordance with embodiments of the subject matter of the present application. The cutting tool 20 has a replaceable cutting head 22 that has a head longitudinal axis A, around which the replaceable cutting head 22 rotates in a direction of rotation R. The replaceable cutting head 22 can be typically made from cemented carbide. The head longitudinal axis A extends in a forward $D_F$ to rearward direction $D_R$. The cutting tool 20 also has a tool holder 24. The tool holder 24 can be typically made from steel. The replaceable cutting head 22 can be removably retained in the tool holder 24 by means of a coupling mechanism. Such a coupling mechanism could possibly be advantageous for other types of rotary cutting operations than those stated hereinabove, such as, for example, slotting or grooving.

It should be appreciated that use of the terms "forward" and "rearward" throughout the description and claims refer to a relative position in a direction of the head longitudinal axis A towards the left and right, respectively, in FIGS. 6, 8, 12 and 14.

Reference is now made to FIGS. 3 to 7. The replaceable cutting head 22 has a forward portion that forms a cutting portion 26 and a rearward portion that forms a mounting portion 28. In accordance with some embodiments of the subject matter of the present application the replaceable cutting head 22 can be formed from a unitary integral one-piece construction. This provides an advantage in that the replaceable cutting head 22 has no detachable cutting inserts (not shown). Such detachable cutting inserts can be replaced periodically and this can be a time consuming procedure. There is also a possibility that threaded screws (not shown), for example, which can be used to releasably retain the detachable cutting inserts to the replaceable cutting head 22 can be mislaid and/or lost during the replacement operation.

Figure 4:
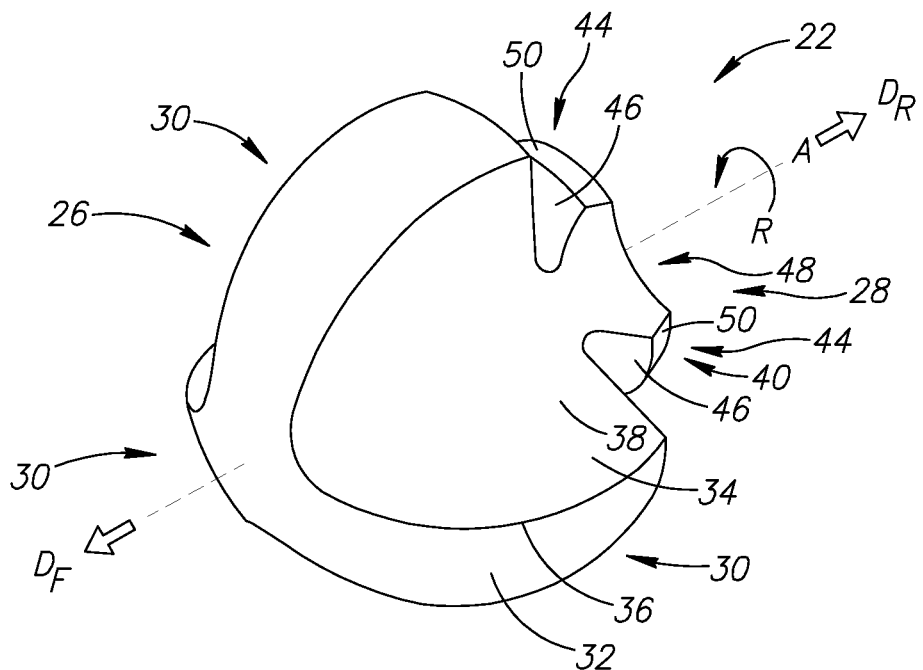
FIG. 4 is a front perspective view of the replaceable cutting head shown in FIG. 3.
Figure 5:
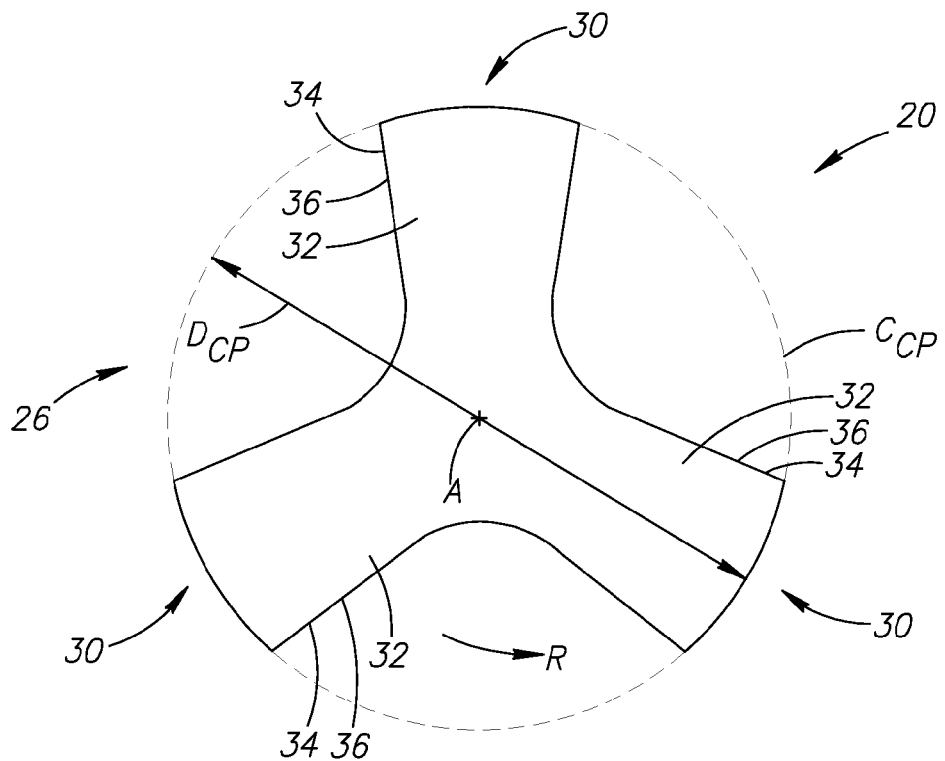
FIG. 5 is a front view of the replaceable cutting head shown in FIG. 3.

As shown in FIGS. 4 and 5, the cutting portion 26 includes a plurality of cutting members 30 that extend radially with respect to the head longitudinal axis A. In accordance with some embodiments of the subject matter of the present application, each cutting member 30 can include a relief surface 32, a rake surface 34 and a cutting edge 36, at the intersection thereof. The cutting edge 36 can extend in a direction generally parallel to the head longitudinal axis A. The relief surface 32 can be located circumferentially rearward of the cutting edge 36 and the rake surface 34 can be located circumferentially forward of the cutting edge 36, both in respect to the direction of rotation R. The orientation of the cutting edge 36 with respect to the direction of rotation R allows metal cutting operations to be performed. Each cutting member 30 can include a head flute surface 38 for evacuating chips (not shown) that are produced during the cutting operation.

In accordance with some embodiments of the subject matter of the present application, the cutting portion 26 can be devoid of a surface that faces against the direction of rotation R that serves as a driven surface for applying torque transmission to the replaceable cutting head 22.

Referring now to FIG. 5, in an end view perpendicular to the head longitudinal axis A, an imaginary cutting portion circle $C_{CP}$ that circumscribes the cutting portion 26 has a maximum cutting portion diameter $D_{CP}$. In this non-limiting example, the maximum cutting portion diameter $D_{CP}$ can be greater than or equal to 25 mm. This is particularly applicable for a replaceable cutting head 22 used for a milling operation. In another non-limiting example, the maximum cutting portion diameter $D_{CP}$ can be less than 25 mm.

Figure 3:
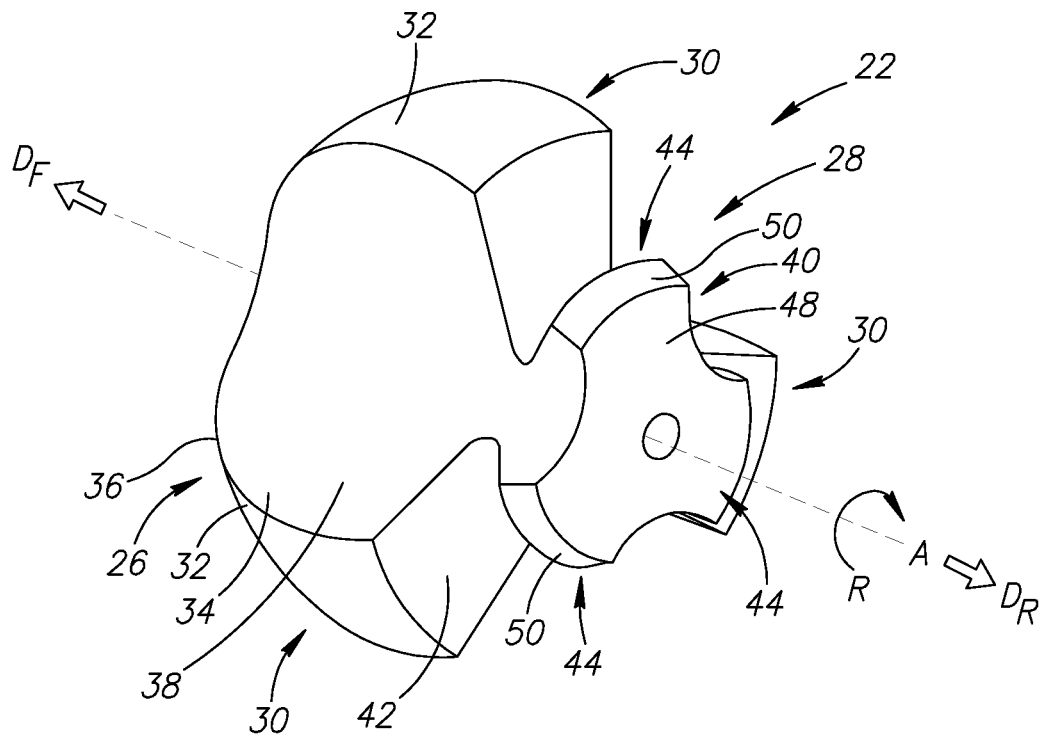
FIG. 3 is a rear perspective view of a replaceable cutting head shown in FIGS. 1 and 2.
Figure 6:
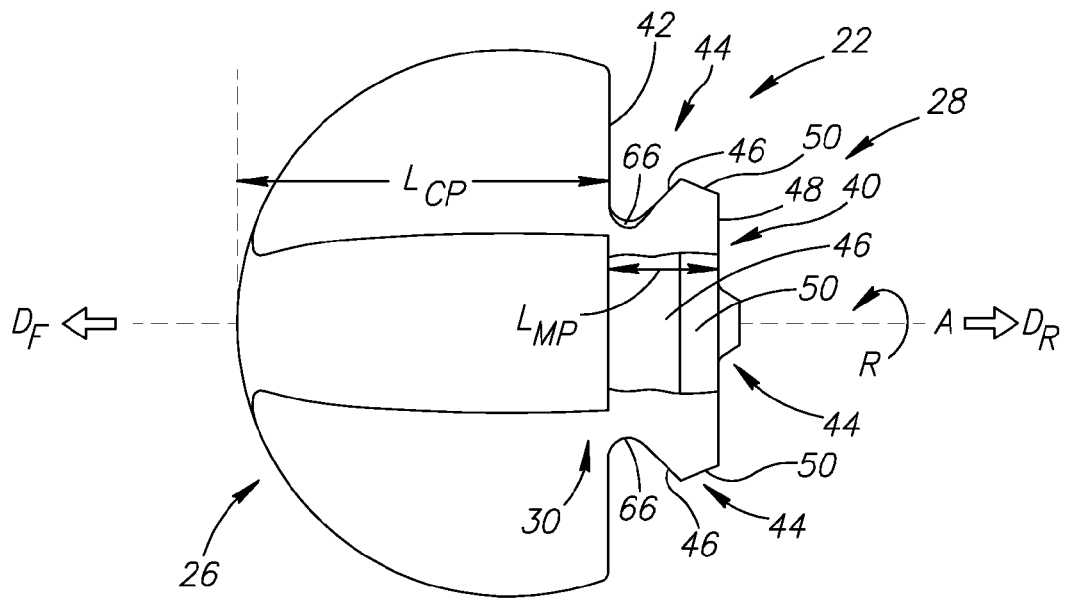
FIG. 6 is a side view of the replaceable cutting head shown in FIG. 3.

Making reference now to FIGS. 3 and 6, the mounting portion 28 includes a male coupling member 40 that protrudes rearwardly from a base surface 42. The base surface 42 extends transversely with respect to the head longitudinal axis A and defines a boundary between the cutting portion 26 and the mounting portion 28. That is to say, the cutting portion 26 is formed forward of the base surface 42 and the mounting portion 28 is formed rearward of the base surface 42. In accordance with some embodiments of the subject matter of the present application the male coupling member can be rigid. The base surface 42 can be perpendicular to the head longitudinal axis A. The base surface 42 is intended to abut a corresponding surface on the tool holder 24 when the cutting tool 20 is in a locked position, as will be described hereinafter.

Reference is now made to FIGS. 3, 4, 7 and 9. The male coupling member 40 includes three circumferentially spaced apart head fixation members 44. Each head fixation member 44 includes a head peripheral surface 46 that spirals inwardly in a direction against the direction of rotation R. Stated differently, in each cross section of the male coupling member 40 taken in a plane through the head peripheral surface 46 and perpendicular to the head longitudinal axis A, a first point P1 on any head peripheral surface 46 is closer to the head longitudinal axis A than a second point P2 on the same head peripheral surface 46, the second point P2 being circumferentially disposed further in the direction of rotation R relative to the first point P1. Each head peripheral surface 46 diverges rearwardly with respect to the head longitudinal axis A. Stated differently, each head peripheral surface 46 generally faces in the forward direction so that the male coupling member 40 has a general dove-tail shape in which the head fixation members 44 extend radially from a central portion of the male coupling member 40.

It should be appreciated that use of the terms "inward" and "outward" throughout the description and claims refer to a relative position in a radial direction in relation to the head longitudinal axis A and/or holder longitudinal axis C inwardly and outwardly, respectively, in FIGS. 5, 7, 9, 11, 13, 15 and 16.

By virtue of the configuration of the male coupling member 40 an improved coupling mechanism is provided where each head peripheral surface 46 is designed to abut a corresponding surface on the tool holder 24 when the cutting tool 20 is in a locked position, as will be described hereinafter, in order to provide a well-constrained coupling of the replaceable cutting head 22 and the tool holder 24. It is pointed out that a male coupling member 40 having exactly two male fixation members 44 provides a coupling where the replaceable cutting head 22 is under-constrained.

Figure 8:
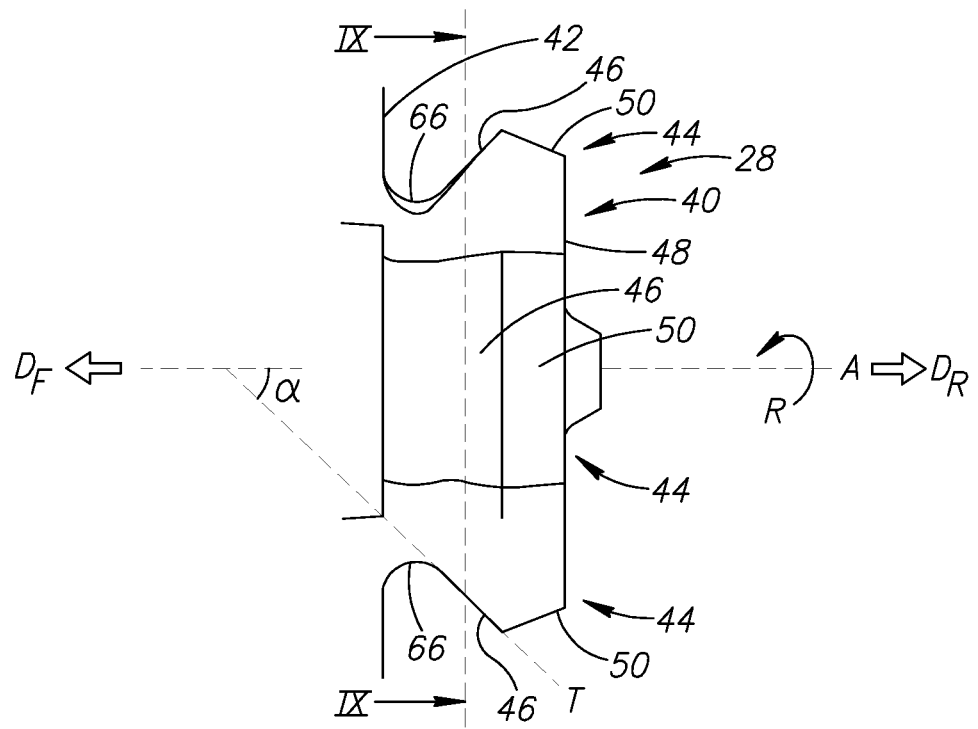
FIG. 8 is a side view of a male coupling member shown in FIG. 6.

As shown in FIG. 8, in accordance with some embodiments of the subject matter of the present application a first angle $\alpha$ is formed between the head longitudinal axis A and a line T tangential to any point on each head peripheral surface 46. The first angle $\alpha$ can be greater than or equal to 35° and less than or equal to 55°. In particular, the first angle $\alpha$ can be constant and have a value of 45°.

In accordance with some embodiments of the subject matter of the present application each head peripheral surface 46 can lie on a portion of the curved surface of an associated imaginary irregular cone, where the cone has a spiral-shaped base surface (not shown).

Figure 9:
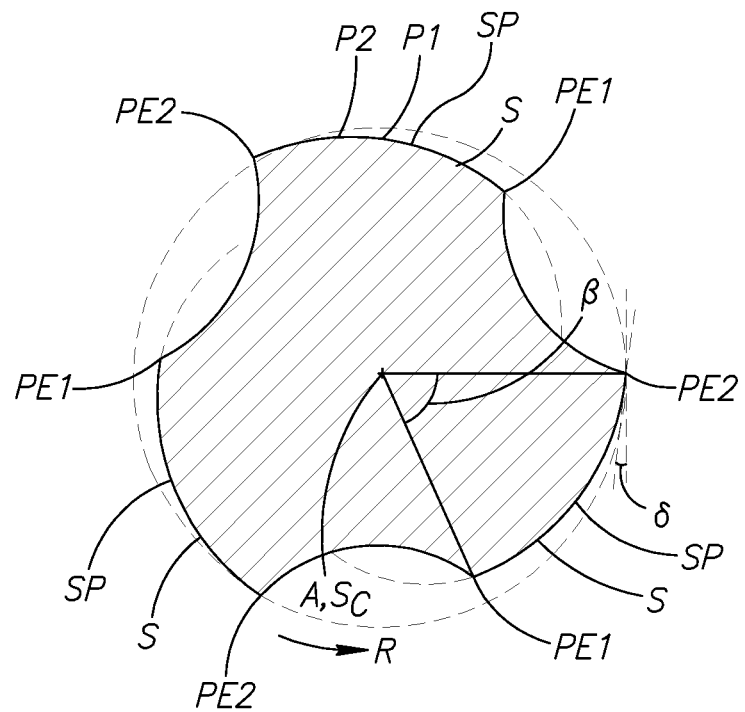
FIG. 9 is a cross section view taken along line IX-IX shown in FIG. 8.

Referring now to FIG. 9, in accordance with some embodiments of the subject matter of the present application, in each cross section of the male coupling member 40 taken in a plane through the head peripheral surface 46 and perpendicular to the head longitudinal axis A, each head peripheral surface 46 can lie on a spiral S, that has a spiral center $S_C$. Each head peripheral surface 46 can form a spiral portion SP. The two end points of each spiral portion SP can form a first and second end point PE1 PE2, the first end point PE1 being circumferentially rearward than the second end point PE2 in respect to the direction of rotation R. The two end points PE1, PE2 are the points furthest from each other on the same spiral portion SP. It can be equivalently stated, since each spiral portion SP lies on the head peripheral surface 46, that the first and second end point PE1 PE2 are formed at the extremities of each head peripheral surface 46, in each said cross section. The two end points PE1, PE2 can subtend a peripheral surface angle β relative to the spiral center $S_C$. The peripheral surface angle β can be greater than or equal to 30° and less than or equal to 60°. Each spiral S can be an Archimedean spiral. The pitch angle δ of each spiral portion SP can be less than 30°. Each spiral center $S_C$ can be coincident with the head longitudinal axis A. The pitch angle δ determines the magnitude of the force that must be applied in order to self-lock the replaceable cutting head 22 into the tool holder 24. It should be appreciated that use of the terms "pitch angle" throughout the description and claims refer the angle the spiral makes with circles centered at the spiral center $S_C$.

In accordance with some embodiments of the subject matter of the present application the male coupling member 40 can further include a rear surface 48. The rear surface 48 can intersect the rearmost portion of each head fixation member 44. The rear surface 48 can be perpendicular with respect to the head longitudinal axis A. As is best shown in FIG. 8, each head fixation member 44 can further include a chamfered surface 50. Each chamfered surface 50 can extend between its respective head peripheral surface 46 and the rear surface 48, and can converge rearwardly with respect to the head longitudinal axis A. The chamfered surface 50 can have a frustoconical shape. The chamfered surface 50 is intended to guide the male coupling member 40 into the correct position within a corresponding female coupling member. As seen in FIG. 6, each head fixation member 44 can further include a concave surface 66, extending between the base surface 42 and each head peripheral surface 46.

Figure 7:
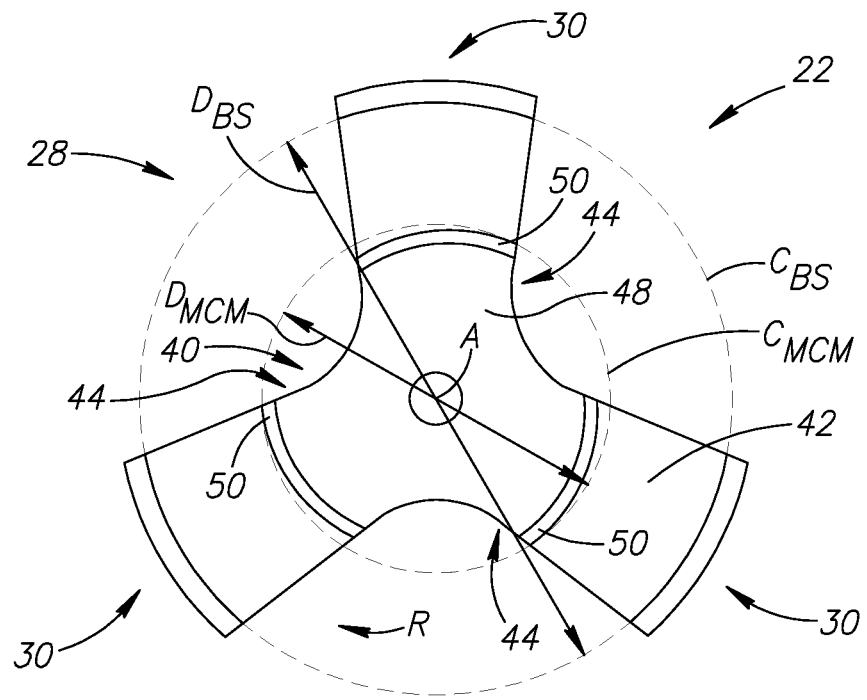
FIG. 7 is a rear view of the replaceable cutting head in FIG. 3.

Making reference now to FIG. 7, in accordance with some embodiments of the subject matter of the present application an imaginary base surface circle $C_{BS}$ that circumscribes a largest dimension of the base surface 42, taken perpendicular to the head longitudinal axis A, can have a maximum base surface diameter $D_{BS}$. An imaginary male coupling member circle $C_{MCM}$ that circumscribes a largest dimension of the male coupling member 40, taken perpendicular to the head longitudinal axis A, can have a maximum male coupling member diameter $D_{MCM}$. The maximum base surface diameter $D_{BS}$ can be at least one and a half times as large as the maximum male coupling member diameter $D_{MCM}$.

Making reference now to FIG. 6, in accordance with some embodiments of the subject matter of the present application, measured in the direction of the head longitudinal axis A, the cutting portion 26 has a maximum cutting portion length $L_{CP}$ and the mounting portion 28 has a maximum mounting portion length $L_{MP}$. The maximum cutting portion length $L_{CP}$ is measured in the forward direction $D_F$ from the base surface 42 to the forwardmost point of the cutting head. The maximum mounting portion length $L_{MP}$ is measured in the rearward direction $D_R$ from the base surface 42 to the rear surface 48. The maximum cutting portion length $L_{CP}$ can be at least two and a half times greater than the maximum mounting portion length $L_{MP}$. This is particularly applicable when the replaceable cutting head 22 is intended for a milling operation. In another non-limiting example, the maximum cutting portion length $L_{CP}$ can be less than two and a half times greater than the maximum mounting portion length $L_{MP}$. This is particularly applicable when the replaceable cutting head is intended for a slotting or grooving operation. The maximum base surface diameter $D_{BS}$ can be at least three times greater than the maximum mounting portion length $L_{MP}$.

In accordance with some embodiments of the subject matter of the present application, the head peripheral surfaces 46 can serve as spiral driven surfaces applying torque transmission to the replaceable cutting head 22. The mounting portion 28 can be devoid of a surface that faces against the direction of rotation R that serves as a driven surface for providing torque transmission to the replaceable cutting head 22.

In accordance with some embodiments of the subject matter of the present application the male coupling member 40 can be devoid of a resilience slit. Referring now to FIG. 7, the male coupling member 40 can exhibit 3-fold rotational symmetry about the head longitudinal axis A. In this non-limiting example, the number of cutting members 30 can also be three. Also in this non-limiting example, the replaceable cutting head 22 can exhibit 3-fold rotational symmetry about the head longitudinal axis A.

Figure 10:
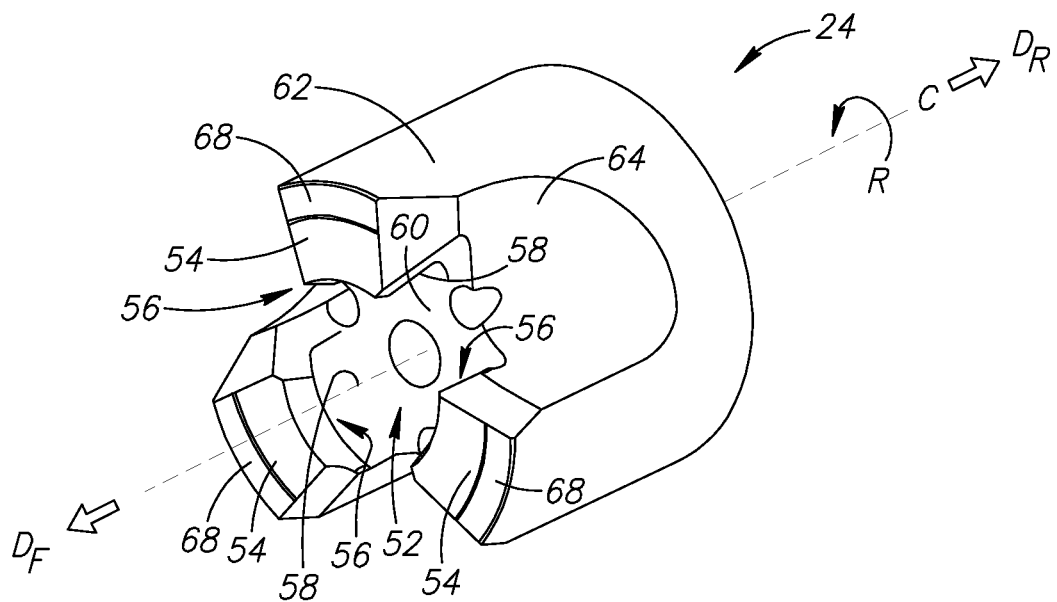
FIG. 10 is a front perspective of a tool holder shown in FIGS. 1 and 2.
Figure 11:
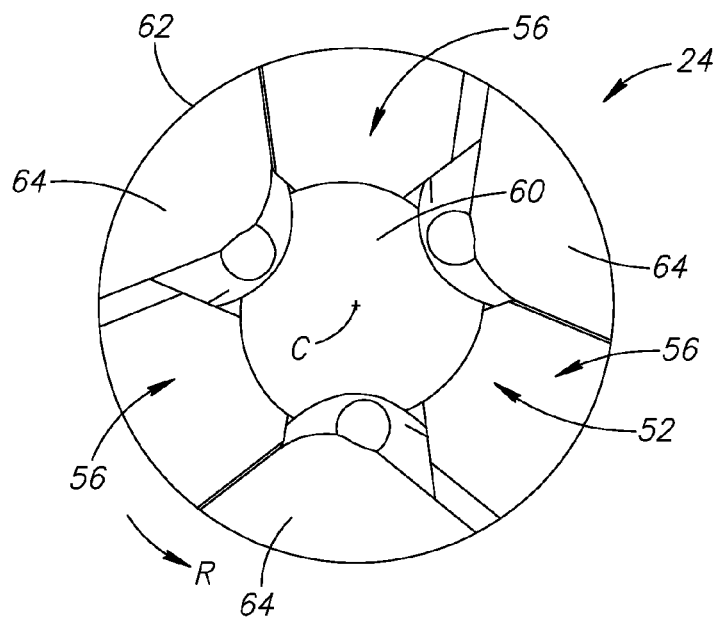
FIG. 11 is a front view of the tool holder shown in FIG. 10.
Figure 12:
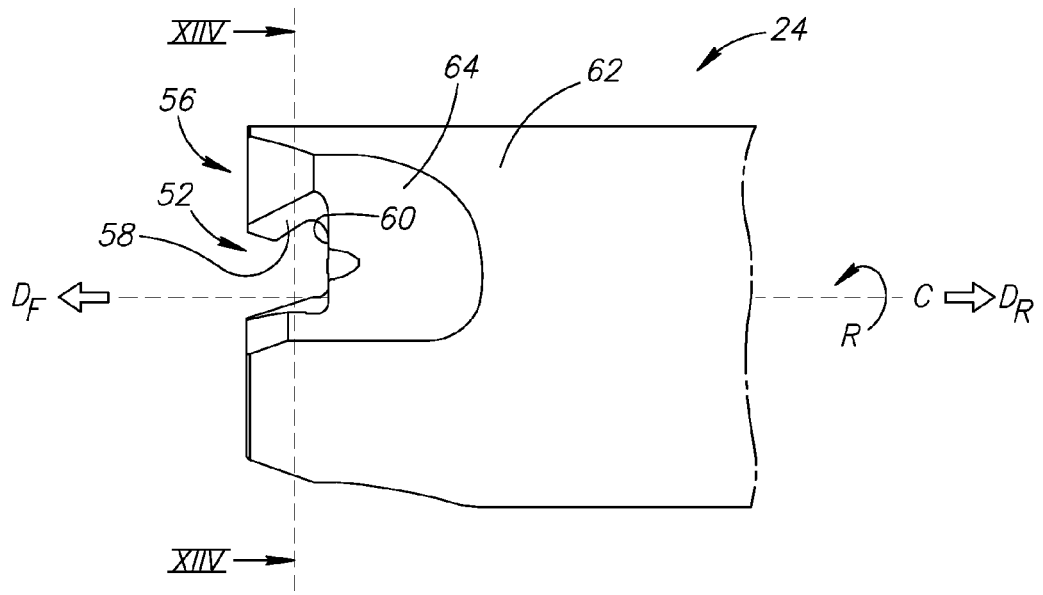
FIG. 12 is a side view of the tool holder shown in FIGS. 10 and 11.

Another aspect of the subject matter of the present application includes the cutting tool 20 that has the replaceable cutting head 22 and the tool holder 24. The male coupling member 40 of the replaceable cutting head 22 includes a rear surface 48. The rear surface 48 intersects the rearmost portion of each head fixation member 44. Referring now to FIGS. 10 to 12, the tool holder 24 has a holder longitudinal axis C that extends in the forward $D_F$ to rearward direction $D_R$. The tool holder 24 includes a female coupling member 52 that extends rearwardly from a holder forward surface 54. The holder forward surface 54 extends transversely with respect to the holder longitudinal axis C. The female coupling member 52 includes three circumferentially spaced apart holder fixation members 56. Each holder fixation member 56 includes a recessed holder peripheral surface 58 that diverges rearwardly with respect to the holder longitudinal axis C. Stated differently, each recessed holder peripheral surface 58 generally faces in the rearward direction $D_R$. As seen from FIGS. 11 and 12, each holder peripheral surface 58 is formed as an undercut of a corresponding holder fixation member 56 and thus is hidden from view in a front view of the tool holder 24 along the longitudinal axis C. The female coupling member 52 includes a holder rear surface 60 that extends transversely with respect to the holder longitudinal axis C and that intersects each holder fixation member 56.

Figure 13:
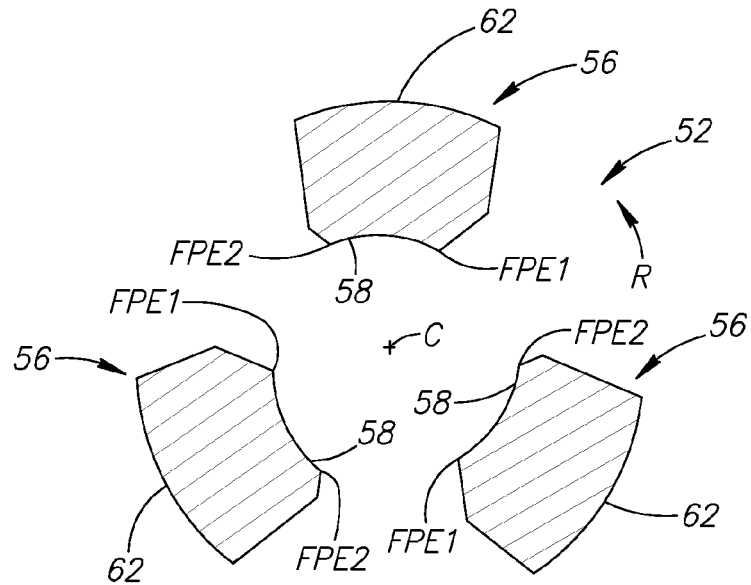
FIG. 13 is a cross section view taken along line XIIV-XIIV shown in FIG. 12.

Referring now to FIG. 13, in accordance with some embodiments of the subject matter of the present application, in each cross section of the female coupling member 52 taken in a plane through the holder peripheral surface 58 and perpendicular to the holder longitudinal axis C, the two female end points on the same holder peripheral surface 58 form a first and second female end point FPE1 FPE2, the first female end point FPE1 being circumferentially rearward than the second female end point FPE2 in respect to the direction of rotation R. The two female end points FPE1, FPE2 are the points furthest from each other on the same holder peripheral surface 58 in each cross section of the female coupling member 52 taken in a plane through the holder peripheral surface 58 and perpendicular to the holder longitudinal axis C.

Figure 14:
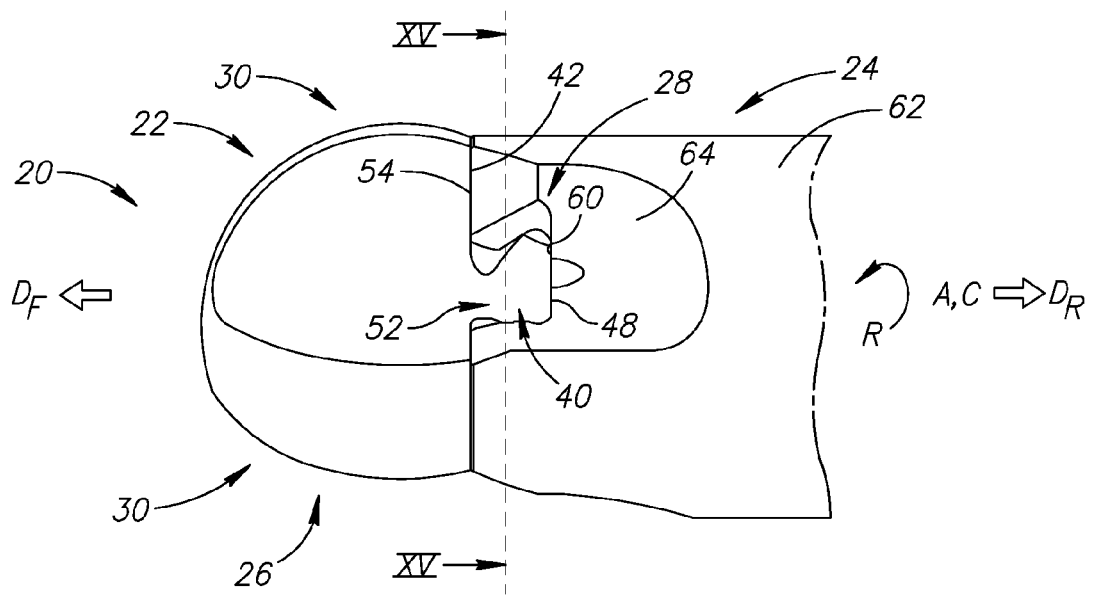
FIG. 14 is a side view of the cutting tool shown in FIGS. 1 and 2.
Figure 15:
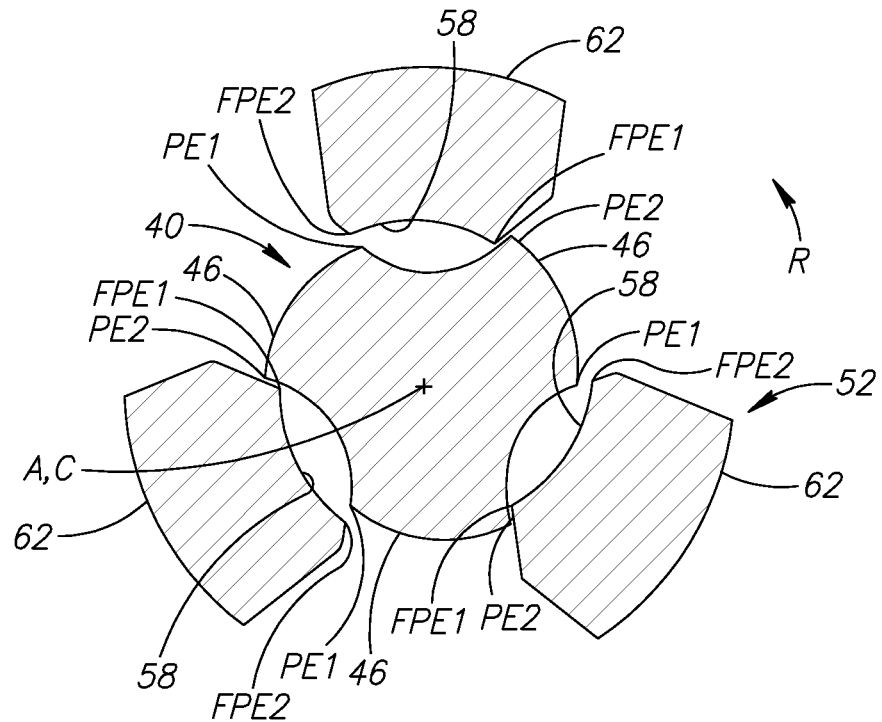
FIG. 15 is a cross section view taken along line XV-XV shown in FIG. 14 when the cutting tool is in a released position.
Figure 16:
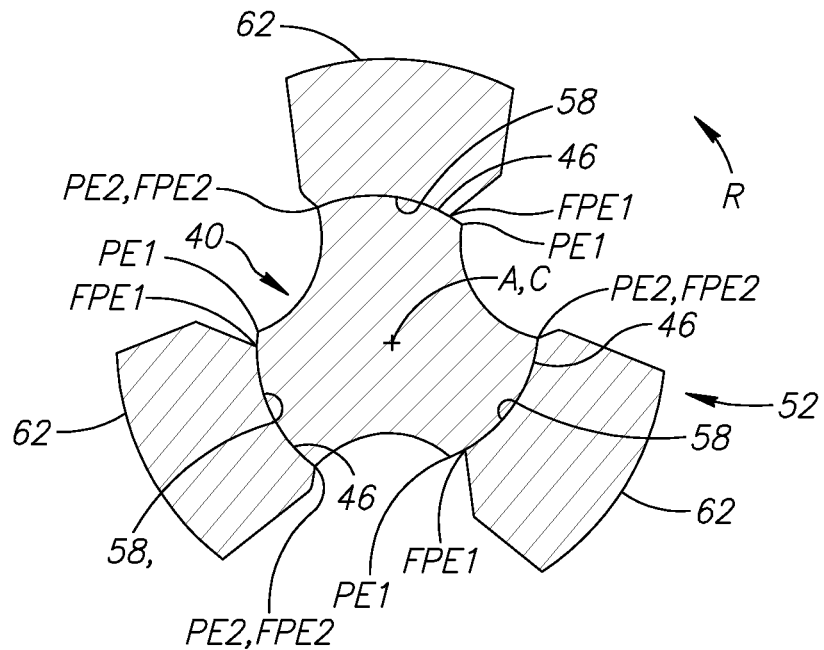
FIG. 16 is a cross section view taken along line XV-XV shown in FIG. 14 when the cutting tool is in a locked position.
It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

Referring now to FIGS. 15 and 16, the replaceable cutting head 20 is rotatable between a released position and a locked position. In the locked position, the male coupling member 40 is removably retained in the female coupling member 52. As best shown in FIGS. 14 and 16, each of the head peripheral surfaces 46 abuts a corresponding holder peripheral surface 58. The base surface 42 abuts the holder forward surface 54. The rear surface 48 is spaced apart from the holder rear surface 60.

Further in a locked position, in accordance with some embodiments of the subject matter of the present application, in each cross section of the cutting tool 40 perpendicular to the head longitudinal axis A taken in a plane through the head peripheral surface 46 and holder peripheral surface 58, each first end point PE1 on the head peripheral surface 46 can be spaced apart from the female first end point FPE1 on its associated holder peripheral surface 58. Each second end point PE2 on the head peripheral surface 46 can be adjacent to the second female end point FPE2 on its associated holder peripheral surface 58. It should be appreciated that use of the terms "associated" throughout the description in respect to the head peripheral surfaces 46 and holder peripheral surfaces 58 refer to the head peripheral surface 46 and the holder peripheral surface 58 that abut each other when the cutting tool 20 is in the locked position.

In accordance with some embodiments of the subject matter of the present application, the tool holder 24 can further include a holder shank surface 62 that extends rearwardly from the holder forward surface 54. In this non-limiting example, the female coupling member 52 can open out to the holder shank surface 62 at three circumferentially spaced apart holder flute surfaces 64. In this case the holder forward surface 54 can be formed from three spaced apart portions. In another non-limiting example the female coupling member 52 cannot open out to the holder shank surface 62. Stated differently the female coupling member 52 is closed. In this case the holder forward surface 54 can be formed from a single continuous portion.

As best seen in FIG. 13, in accordance with some embodiments of the subject matter of the present application, each holder peripheral surface 58 can spiral inwardly in a direction against the direction of rotation R. The head longitudinal axis A can be coaxial with the holder longitudinal axis C. The peripheral portion of the holder forward surface 54 can include a raised surface 68. Stated differently, the raised surface 68 protrudes in a forward direction $D_F$ from the holder forward surface 54. The raised surface 68 is intended to ensure that the abutment of the base surface 42 with the holder forward surface 54 occurs at a peripheral portion of the holder forward surface 54 in order to provide a solid support surface, and not, for example at an area close to the holder longitudinal axis C.

Another aspect of the subject matter of the present application includes a tool holder 24 as defined herein above. Each holder peripheral surface 58 spirals inwardly in a direction against the direction of rotation R. Thus, as seen in FIG. 13, in each cross-section of the female coupling member 52 taken in a plane through the holder peripheral surfaces 58 and perpendicular to the holder longitudinal axis C, a first female end point FPE1 on a given holder peripheral surface 58 is closer to the holder longitudinal axis C than a second female end point FPE2 on the same holder peripheral surface 58, the second female end point FPE2 being circumferentially disposed further in the direction of rotation R relative to the first female end point FPE1.

Assembly of the cutting tool 20 is accomplished by performing the following steps. The male coupling member 40 is inserted into the female coupling member 52 such that each head fixation member 44 is located axially forward and circumferentially between, each adjacent pair of holder fixation members 56 (as best seen in FIG. 15). The replaceable cutting head 22 is then displaced rearwardly until the base surface 42 initially comes into contact with the holder forward surface 54. It should be noted that the head fixation members 44 and the holder fixation members 56 are so designed so that there is adequate space between each adjacent pair of holder fixation members 56 to allow the placement of a head fixation member 44. In this position the cutting tool 20 is in a released position.

It is pointed out that, as seen in FIG. 15, in the released position, in each cross section of the cutting tool 40 perpendicular to the head longitudinal axis A taken in a plane through the head peripheral surface 46 and holder peripheral surface 58, the distance of the first end point PE1 on each head peripheral surface 46 to the head longitudinal axis A is less than the distance of the corresponding second female end point FPE2 on the associated holder peripheral surface 58 to the head longitudinal axis A. By virtue of the spiral shape of the head peripheral surface 46, the distance of the second end point PE2 on each head peripheral surface 46 to the head longitudinal axis A is more than the distance of the corresponding first female end point FPE1 on an associated holder peripheral surface 58 to the head longitudinal axis A.

The replaceable cutting head 22 is rotated in a direction against the direction of rotation R, until each head peripheral surface 46 initially comes into contact with a corresponding respective holder peripheral surface 58. Rotating the replaceable cutting head 22 further in a direction against the direction of rotation R pushes on the holder peripheral surfaces 58, thereby forcing the corresponding holder fixation members 56 to be elastically displaced in a radially outwardly direction with respect to the holder longitudinal axis C. This is due to the increasing radius of the head peripheral surface 46. Consequently the holder forward surface 54 is displaced axially forwardly until it firmly abuts the base surface 42. The rear surface 48 is spaced apart from the holder rear surface 60. In this locked position, a tight fit between the replaceable cutting head 22 and the tool holder 24 is accomplished. The coupling mechanism described herein above provides a self-lock between the replaceable cutting head 22 and the tool holder 24.

It should be noted that the value of the pitch angle δ as described above determines the amount of rotational force required to accomplish the locked position of the cutting tool 20. Stated differently, as the pitch angle approaches 0° less force is required to rotate the replaceable cutting head 22 in the tool holder 24. However, more rotational displacement (e.g. rotations and/or partial rotations) of the replaceable cutting head 24 is required to accomplish a self-lock. Alternatively, as the pitch angle increases away from 0° more force is required to rotate the replaceable cutting head 22 in the tool holder 24. Moreover, by virtue of the head peripheral surfaces 46 being spiraling surfaces, the magnitude of the rotational force required to accomplish the locked position increases gradually and smoothly.

It should also be noted that a feature of subject matter of the present application is that the male and female coupling members 40, 52 provide an improved coupling mechanism in particular for large replaceable cutting heads 22, where the maximum cutting portion diameter $D_{CP}$ can be greater than or equal to 25 mm.

The design of the replaceable cutting head 22 and the tool holder 24 according to the subject matter of the present application and, particularly, the shape and orientation of the head peripheral surfaces 46 and the holder peripheral surfaces 58, ensure that the friction between these surfaces is sufficient to keep them in their mutual abutment when the replaceable cutting 22 head and the tool holder 24 are coupled together. This allows for a tight fit of the replaceable cutting head 22 and the tool holder 24 in an accurately established mutual axial and radial position. Consequently, the replaceable cutting head 22 is accurately positioned and securely retained in the tool holder 24 in a self-locking manner. It will be understood from the foregoing that the head peripheral surfaces 46 are spiral driven surfaces applying torque transmission to the replaceable cutting head 22.

Another feature of the subject matter of the present application is that the design of the male coupling member 40 allows for the head peripheral surface 46 to be ground.

Yet another feature of the subject matter of the present application is that there is no requirement for a surface on the cutting portion 26 or the mounting portion 28 that faces against the direction of rotation R and that serves as a driven surface for applying torque transmission to the replaceable cutting head 22.

Yet another feature of the subject matter of the present application is that there is no requirement for a surface on the tool holder 24 that faces the direction of rotation R that serves as a driving surface for providing torque transmission to the replaceable cutting head 22.

Yet another feature of the subject matter of the present application is that the size of the mounting portion 28 is small in relation to the size of mounting portions of other cutting tools having a cutting portion of comparable size. Therefore, manufacture of replaceable cutting heads 22, in accordance with the subject matter of the present application, requires less material.

Although the subject matter of the present application has been described to a certain degree of particularity, it should be understood that various alterations and modifications could be made without departing from the spirit or scope of the invention as hereinafter claimed.

What is claimed is:

1. A replaceable cutting head (22), for rotary cutting operations, having a head longitudinal axis (A) around which the replaceable cutting head (22) rotates in a direction of rotation (R), the head longitudinal axis (A) extending in a forward ($D_F$) to rearward direction ($D_R$), comprising:
    a forward portion forming a cutting portion (26) and a rearward portion forming a mounting portion (28);
    the cutting portion (26) comprising:
        a plurality of cutting members (30) extending radially with respect to the head longitudinal axis (A); and
    the mounting portion (28) comprising a male coupling member (40) protruding rearwardly from a base surface (42), the base surface (42) extending transversely with respect to the head longitudinal axis (A), and defining a boundary between the cutting portion (26) and the mounting portion (28), the male coupling member (40) comprising:
        three circumferentially spaced apart head fixation members (44), each head fixation member (44) comprising a head peripheral surface (46) diverging rearwardly with respect to the head longitudinal axis (A), wherein:
        in each cross section of the male coupling member (40) taken in a plane through the head peripheral surface (46) and perpendicular to the head longitudinal axis (A), a first end point (PE1) on any head peripheral surface (46) is closer to the head longitudinal axis (A) than a second end point (PE2) on the same head peripheral surface (46), the second end point (PE2) being circumferentially disposed further in the direction of rotation (R) relative to the first end point (PE1).

2. The replaceable cutting head (22) according to claim 1, wherein
    a first angle $\alpha$ is formed between the head longitudinal axis (A) and a line (T) tangential to any point on each head peripheral surface (46), wherein the first angle $\alpha$ is in the range of $35° \leq \alpha \leq 55°$.

3. The replaceable cutting head (22) according to claim 2, wherein the first angle ($\alpha$) is a 45° angle.

4. The replaceable cutting head (22) according to claim 1, wherein
    in each cross section of the male coupling member (40) taken in a plane through the head peripheral surface (46) and perpendicular to the head longitudinal axis (A), each head peripheral surface (46) lies on a spiral (S), having a spiral center ($S_C$), each head peripheral surface (46) forming a spiral portion (SP).

5. The replaceable cutting head (22) according to claim 4, wherein
    the two end points (PE1, PE2) of each spiral portion (SP) subtend a peripheral surface angle $\beta$ relative to the spiral center ($S_C$); wherein the peripheral surface angle $\beta$ is in the range of $30° \leq \beta \leq 60°$.

6. The replaceable cutting head (22) according to claim 4, wherein each spiral center ($S_C$) is coincident with the head longitudinal axis (A).

7. The replaceable cutting head (22) according to claim 4, wherein each spiral (S) is an Archimedean spiral.

8. The replaceable cutting head (22) according to claim 7, wherein the pitch angle ($\delta$) of each spiral portion (SP) is less than 30°.

9. The replaceable cutting head (22) according to claim 1, wherein
    the head peripheral surfaces (46) serve as spiral driven surfaces applying torque transmission to the replaceable cutting head (22); and
    the cutting portion (26) is devoid of a surface facing against the direction of rotation (R) that serves as a driven surface for applying torque transmission to the replaceable cutting head (22).

10. The replaceable cutting head (22) according to claim 1, wherein
    the head peripheral surfaces (46) serve as spiral driven surfaces applying torque transmission to the replaceable cutting head (22); and
    the mounting portion (28) is devoid of a surface facing against the direction of rotation (R) that serves as a driven surface applying torque transmission to the replaceable cutting head (22).

11. The replaceable cutting head (22) according to claim 1, wherein the male coupling member (40) is devoid of a resilience slit.

12. The replaceable cutting head (22) according to claim 1, wherein the base surface (42) is perpendicular to the head longitudinal axis (A).

13. The replaceable cutting head (22) according to claim 1, wherein
    in an end view perpendicular to the head longitudinal axis (A), an imaginary cutting portion circle ($C_{CP}$) circumscribing the cutting portion (26) has a maximum cutting portion diameter ($D_{CP}$); and
    the maximum cutting portion diameter ($D_{CP}$) is greater than or equal to 25 mm.

14. The replaceable cutting head (22) according to claim 1, wherein
    an imaginary base surface circle ($C_{BS}$) circumscribing a largest dimension of the base surface (42), taken perpendicular to the head longitudinal axis (A), has a maximum base surface diameter ($D_{BS}$);

an imaginary male coupling member circle ($C_{MCM}$) circumscribing a largest dimension of the male coupling member (40), taken perpendicular to the head longitudinal axis (A), has a maximum male coupling member diameter ($D_{MCM}$); and the maximum base surface diameter ($D_{BS}$) is at least one and a half times as large as the maximum male coupling member diameter ($D_{MCM}$).

15. The replaceable cutting head (22) according to claim 1, wherein, measured in the forward direction ($D_F$) along the head longitudinal axis (A) from the base surface (42), the cutting portion (26) has a maximum cutting portion length ($L_{CP}$), measured in the rearward direction ($D_R$) along the head longitudinal axis (A) from the base surface (42), the mounting portion (28) has a maximum mounting portion length ($L_{MP}$); and the maximum cutting portion length ($L_{CP}$) is at least two and a half times greater than the maximum mounting portion length ($L_{MP}$).

16. The replaceable cutting head (22) according to claim 1, wherein, measured in the rearward direction ($D_F$) along the head longitudinal axis (A) from the base surface (42), the mounting portion (28) has a maximum mounting portion length ($L_{MP}$);

an imaginary base surface circle ($C_{BS}$) circumscribing a largest dimension of the base surface (42), taken perpendicular to the head longitudinal axis (A), has a maximum base surface diameter ($D_{BS}$); and the maximum base surface diameter ($D_{BS}$) is at least three times greater than the maximum mounting portion length ($L_{MP}$).

17. The replaceable cutting head (22) according to claim 1, wherein the male coupling member (40) exhibits 3-fold rotational symmetry about the head longitudinal axis (A).

18. The replaceable cutting head (22) according to claim 1, comprising a unitary integral one-piece construction.

19. The replaceable cutting head (22) according to claim 1, wherein each head peripheral surface (46) lies on a portion of the curved surface of an associated imaginary irregular cone, the cone having a spiral-shaped base surface.

20. The replaceable cutting head (22) according to claim 1, wherein the male coupling member (40) further comprises a rear surface (48), the rear surface (48) intersecting the rearmost portion of each head fixation member (44).

21. The replaceable cutting head (22) according to claim 20, wherein the rear surface (48) is perpendicular with respect to the head longitudinal axis (A).

22. The replaceable cutting head (22) according to claim 20, wherein each head fixation member (44) further comprises a chamfered surface (50), extending between the rear surface (48) and each head peripheral surface (46), and converging rearwardly with respect to the head longitudinal axis (A).

23. The replaceable cutting head (22) according to claim 20, wherein each head fixation member (44) further comprises a concave surface (66), extending between the base surface (42) and each head peripheral surface (46).

24. A cutting tool (20) comprising:
a replaceable cutting head (22) in accordance with claim 1; and
a tool holder (24), having a holder longitudinal axis (C) extending in the forward ($D_F$) to rearward direction ($D_R$), comprising a female coupling member (52) extending rearwardly from a holder forward surface (54), the holder forward surface (54) extending transversely with respect to the holder longitudinal axis (C), the female coupling member (52) comprising:

three circumferentially spaced apart holder fixation members (56), each holder fixation member (56) comprising a recessed holder peripheral surface (58) diverging rearwardly with respect to the holder longitudinal axis (C); and a holder rear surface (60) extending transversely with respect to the holder longitudinal axis (C) and intersecting each holder fixation member (56); wherein the male coupling member (40) further comprises a rear surface (48), the rear surface (48) intersecting the rearmost portion of each head fixation member (44); and the replaceable cutting head (22) is rotatable between a released position and a locked position, wherein in the locked position:

the male coupling member (40) is removably retained in the female coupling member (52);

each of the head peripheral surfaces (46) abuts a corresponding holder peripheral surface (58);

the base surface (42) abuts the holder forward surface (54); and the rear surface (48) is spaced apart from the holder rear surface (60).

25. The cutting tool (20) according to claim 24, wherein the tool holder (24) further comprises a holder shank surface (62) extending rearwardly from the holder forward surface (54);

the female coupling member (52) opens out to the holder shank surface (62) at three circumferentially spaced apart holder flute surfaces (64); and the holder forward surface (54) comprises three spaced apart portions.

26. The cutting tool (20) according to claim 24, wherein each holder peripheral surface (58) spirals inwardly in a direction against the direction of rotation (R).

27. The cutting tool (20) according to claim 24, wherein the head longitudinal axis (A) is coaxial with the holder longitudinal axis (C).

28. The cutting tool (20) according to claim 24, wherein the peripheral portion of the holder forward surface (54) comprises a raised surface (68).

29. A tool holder (24) having a longitudinal axis (C) extending in a forward ($D_F$) to a rearward direction ($D_R$) and a direction of rotation (R) about the longitudinal axis (C), the tool holder comprising:

a female coupling member (52) extending rearwardly from a holder forward surface (54), the holder forward surface (54) extending transversely with respect to the holder longitudinal axis (C), the female coupling member (52) comprising:

three circumferentially spaced apart holder fixation members (56), each holder fixation member (56) comprising a recessed holder peripheral surface (58) diverging rearwardly with respect to the holder longitudinal axis (C), wherein:

in each cross-section of the female coupling member (52) taken in a plane through the holder peripheral surfaces (58) and perpendicular to the holder longitudinal axis (C), a first female end point (FPE1) on a given holder peripheral surface (58) is closer to the holder longitudinal axis (C) than a second female end point (FPE2) on the same holder peripheral surface (58), the second female end point (FPE2) being circumferentially disposed further in the direction of rotation (R) relative to the first female end point (FPE1); and each holder peripheral surface (58) is formed as an undercut of a corresponding holder fixation member (56) and hidden from view in a front view of the tool holder (24) along the longitudinal axis (C); and a holder rear surface (60) extending transversely with respect to the holder longitudinal axis (C) and intersecting each holder fixation member (56).

* * * * *